March 31, 1925.　　　　　　　　　　　　　　　　1,531,439
C. W. G. HAYDOCK ET AL
PIPE CLEANER
Filed Feb. 4, 1922　　　　　7 Sheets-Sheet 6

WITNESSES:
Lynn Brodton
Augustus B. Coppes

INVENTORS
Charles W. G. Haydock
Norman V. Bureau
BY Joshua R. H. Potts
THEIR ATTORNEY March 31, 1925. 1,531,439
C. W. G. HAYDOCK ET AL
PIPE CLEANER
Filed Feb. 4, 1922 7 Sheets-Sheet 7

WITNESSES:
Lynn Brockton
Augustus B. Coppes

INVENTORS
Charles W. G. Haydock
Norman V. Bureau
BY Joshua R. H. Potts
THEIR ATTORNEY Patented Mar. 31, 1925.

1,531,439

UNITED STATES PATENT OFFICE.

CHARLES W. G. HAYDOCK, OF PHILADELPHIA, PENNSYLVANIA, AND NORMAN V. BUREAU, OF AUDUBON, NEW JERSEY.

PIPE CLEANER.

Application filed February 4, 1922. Serial No. 534,033.

*To all whom it may concern:*

Be it known that we, CHARLES W. G. HAYDOCK and NORMAN V. BUREAU, citizens of the United States, residing at Philadelphia, county of Philadelphia, and State of Pennsylvania, and Audubon, county of Camden, and State of New Jersey, have invented certain new and useful Improvements in Pipe Cleaners, of which the following is a specification.

One object of our invention is to provide an improved device which will dislodge, clean and remove all deposits from the interior of water pipe lines, using water flowing in the line as the source of energy to propel the cleaner and also to remove the obstructing materials encountered by the cleaner; the object of the cleaner operation being to restore the original diameter of the pipe line and also to restore the original carrying capacity of the pipe line by decreasing the frictional loss in pressure of the flowing water due to the removal of the tuberculation, incrustation, iron rust, mud, silt, sand, vegetable growth, such as the lower orders of plant life, or any other foreign matter.

Another object is to make our improved device of such construction that the parts thereof cannot readily be injured or dislodged from their proper operative positions.

Another object is to so arrange the parts that they can be readily adjusted and will accommodate themselves to various conditions under which the device is placed during action.

These objects, and other advantageous ends which will be described hereinafter, we attain in the following manner, reference being had to the accompanying drawings in which.

Referring to the drawings, our improved cleaning device includes as the principal parts a piston or plunger 30 and a cleaning head 31.

The piston 30 includes a series of wooden disks 32 which are arranged in axial alignment and between each two of these disks is interposed a leather gasket or ring 33 of a diameter greater than the disks. Facing plates 34 and 35 are arranged adjacent the outer surfaces of the end disks and bolts 36 extend through the disks and tend to bind them together with the gaskets interposed therebetween; said gaskets preferably having notches 37 through which the bolts 36 extend so as to keep the gaskets in proper arrangement with respect to the axis of the piston. A hollow stem 38 extends entirely through the disks at the axis thereof and a coupling 39 is screwed on one end of the hollow stem 38 and abuts the adjacent end disk 32; the plate 35 having a hole 40 to allow this action. A collar 41 is screwed on the opposite end of the hollow stem 38 and abuts the plate 34 so that the several disks are securely held to the hollow stem 38. A valve 42 is secured to the coupling 39 and has an open end 43 for allowing water, in a manner hereinafter described, to pass into and through the hollow stem 38 and the amount of this water can be varied by the adjustment of a handle 44 on the valve 42. The hollow stem 38 communicates with the interior of the collar 41 and said collar has lateral openings 45 to allow the water passing through the stem 38 to be ejected in front of the piston in a manner hereinafter described. Another stem section 46 is screwed into the opposite end of the collar 41 and at its forward end has secured thereto a coupling 47 into which is screwed an eye 48.

The cleaner head 31 includes an elongated hollow metallic core 49 to one end of which is attached, preferably by a screw thread connection, a cap 50. Into this cap and axially with respect to the core 49 is screwed a stem section 51 having at its outer end a coupling 52 secured thereto into which is screwed one end of an eye 53; said eye passing through the eye 48 on the piston section to provide a flexible joint between the cleaner section and the piston section. The outer surface of the core 49 has three annular bosses 54, 55 and 56. These bosses are spaced from each other in the direction of the length of the core; the boss 54 being adjacent the front end of the core; the boss 56 being adjacent the rear end of the core and the boss 55 being interposed between the bosses 54 and 56. The outer surfaces of these bosses extend at a slant to the axis of the core 49 or in other words are made frusto-conical.

One series of flexible resilient arms 57 are secured at their forward ends to the outer surface of the boss 55 by stud bolts 58. These arms 57 are made comparatively long of flat strip metal so that when bolted to the frusto-conical outer surface of the boss 55 they will normally assume rearwardly diverging positions spaced annularly. Eye bolts 59 are screwed into the boss 56 in directions at right angles to the outer surface of the boss and these bolts 59 have heads 60 with slots 61 shown in detail in Figures 25 to 28 inclusive, through which the arms 57 extend.

Figures 4, 15:
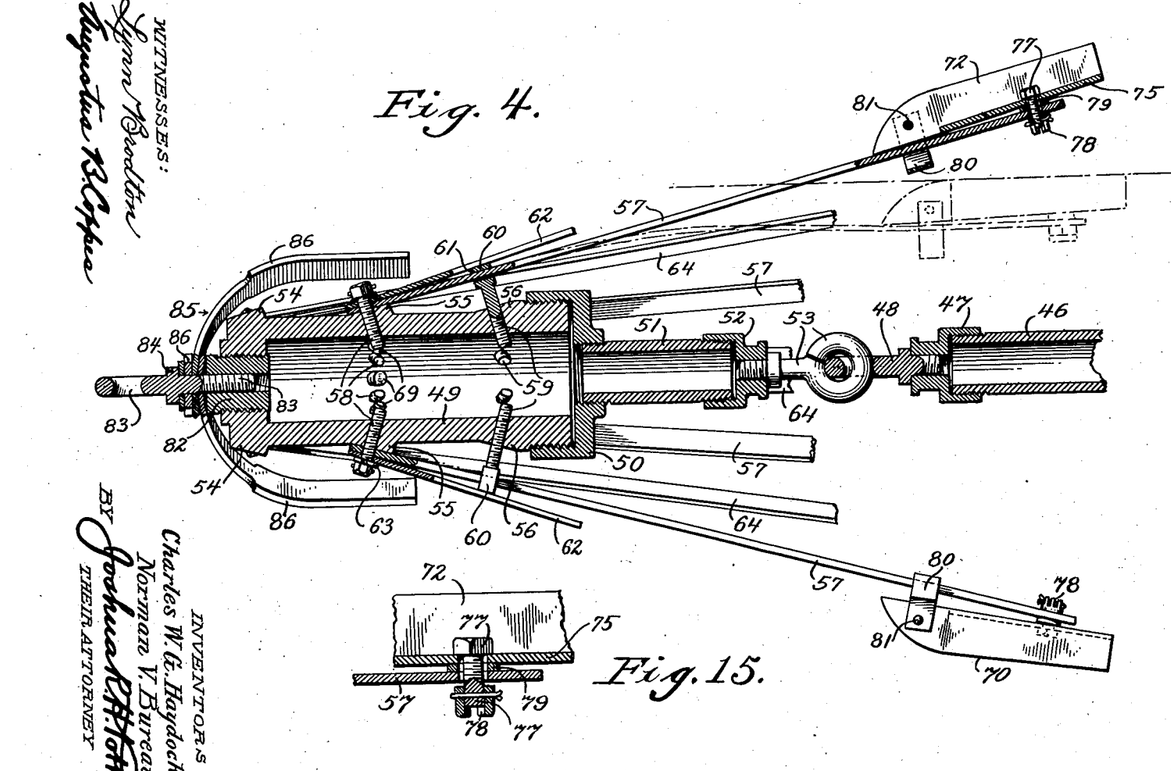
Figure 4 is an enlarged fragmentary longitudinal section taken on the line 4—4 of Figure 1.
Figure 15 is an enlarged fragmentary view partly in section showing the means of attachment of one of a number of plows.
Figures 5, 13, 14:
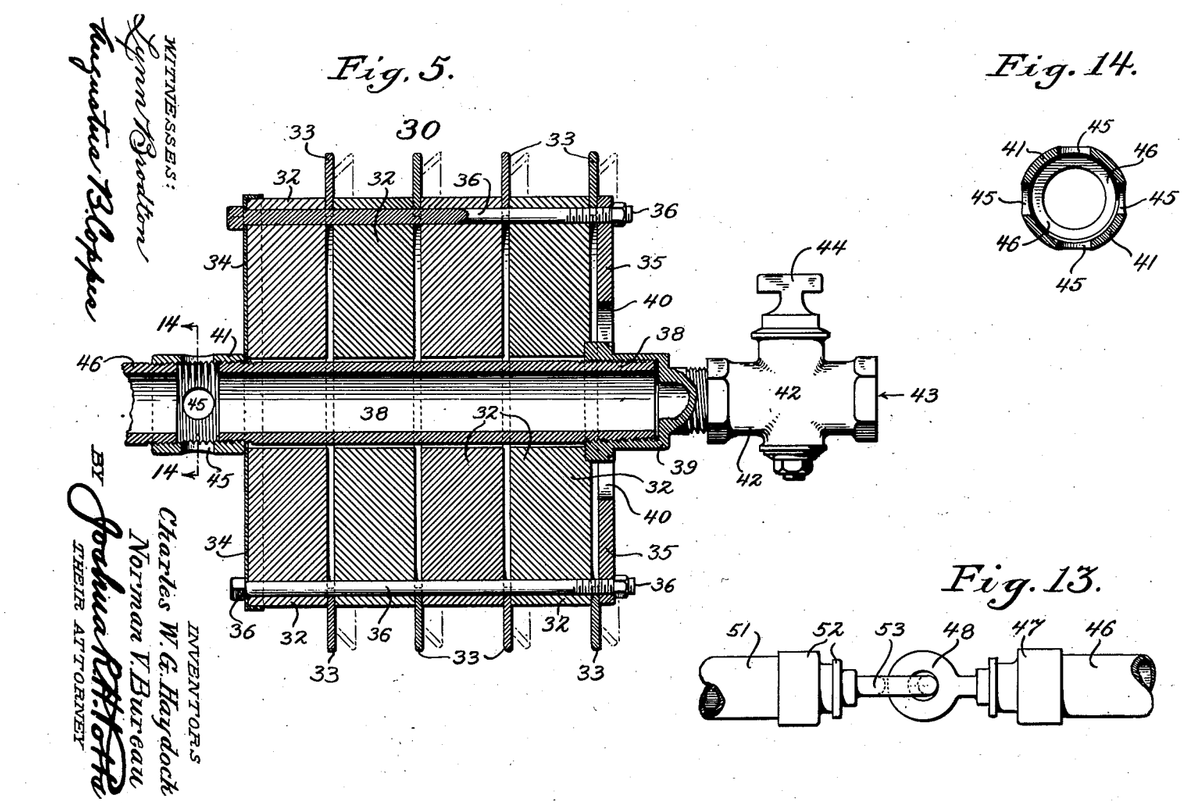
Figure 5 is an enlarged fragmentary section taken on the line 5—5 of Figure 3.
Figure 13 is a fragmentary view showing the connection between the cleaner head and the piston section.
Figure 14 is a section taken on the line 14—14 of Figure 5.
Figures 9, 10, 11, 12, 19, 20, 21, 22, 23, 24:
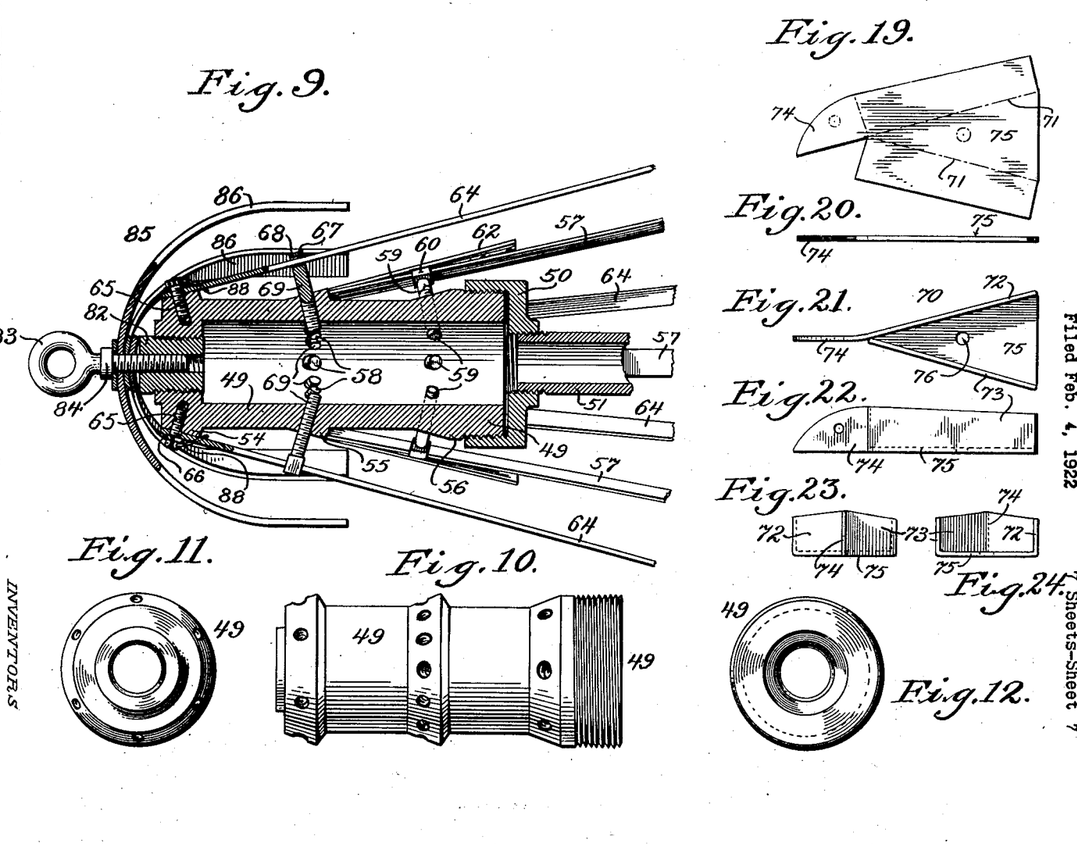
Figure 9 is an enlarged fragmentary longitudinal section taken on the line 9—9 of Figure 2 and on a different plane from that illustrated in Figure 4.
Figure 10 is a longitudinal elevation of the cleaner head core.
Figure 11 is an elevation of one end of said core.
Figure 12 is an elevation of the opposite end of said core.
Figure 19 is a face view of a blank of sheet metal out of which any one of the plows can be made.
Figure 20 is an edge view of Figure 19.
Figure 21 shows the plow having been bent from the blank shown in Figures 19 and 20.
Figure 22 is a side view of Figure 21.
Figure 23 is a front end elevation of said plow.
Figure 24 is a rear end elevation of said plow.
Figure 16:
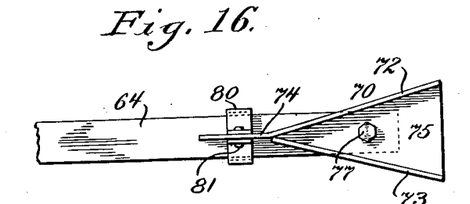
Figure 16 is a fragmentary view showing a face view of one of the plows on its supporting means.
Figures 17, 18, 25, 27, 28:
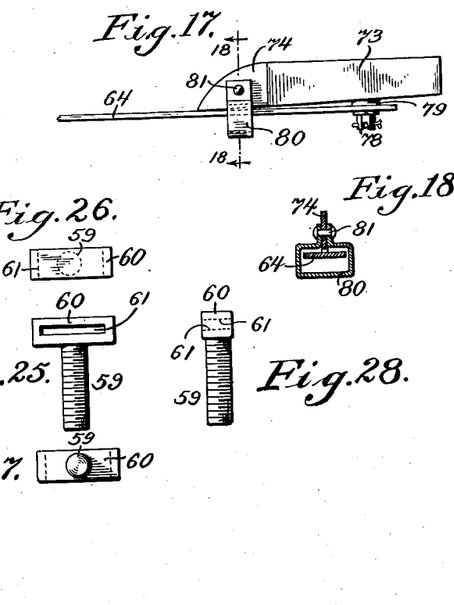
Figure 17 is a side elevational view of Figure 16.
Figure 18 is a section taken on the line 18—18 of Figure 17.
Figure 25 is a face view of one of a number of eye bolts which we preferably employ.
Figure 27 is an inverted plan view of Figure 25.
Figure 28 is a side elevation of Figure 25.

Guard members 62 extend over the heads of the eye bolts 59; said members 62 being in the form of resilient strips which are secured by the stud bolts 58. We preferably provide split washers 63 between the outer heads of the stud bolts and the guard members 62 so as to prevent the stud bolts from working loose; this arrangement being clearly shown in Figure 4. Another series of arms 64, as shown in Figure 9 are secured by stud bolts 65 to the outer surface of the boss 54 in planes passing through the spaces between the arms 57 above described. The stud bolts 65 preferably have split washers 66 interposed between their heads and the arms 64 so as to prevent the stud bolts 65 from working loose. These arms 64 are of the same length as the arms 57 and pass through slots 67 in heads 68 of eye bolts 69. These eye bolts 69 are of the same construction as the eye bolts 59 above described and are screwed into the boss 55 at positions between the stud bolts 58.

The rear end of each of the arms 57 and 64 is provided with a plow 70 and since these plows are all of the same construction it will be necessary to describe but one and it will be understood that all of the other plows are similarly constructed and arranged.

The plows 70 are each made from a blank of sheet metal, such for example as shown in Figures 19 and 20; said metal being bent on the dot-and-dash lines 71 to provide side flanges 72 and 73. The material of the blank is extended as shown at 74 in alignment with the material of the flange 72 and this extension is bent in a plane passing between the flanges 72 and 73; said flanges extending in diverging planes rearwardly from the portion 74. The base 75 of the plow is preferably provided with a bolt hole 76 through which a bolt 77, as clearly shown in Figures 4 and 15, can be inserted and a castellated nut 78 is secured on the bolt so as to connect the plow to its respective arm. We preferably provide a spacing ring 79 between the arm and the base 75 and allow for a slight motion between the plow and the arm by making the holes in the arm and base 75 slightly larger than the diameter of the bolt.

Figure 1:
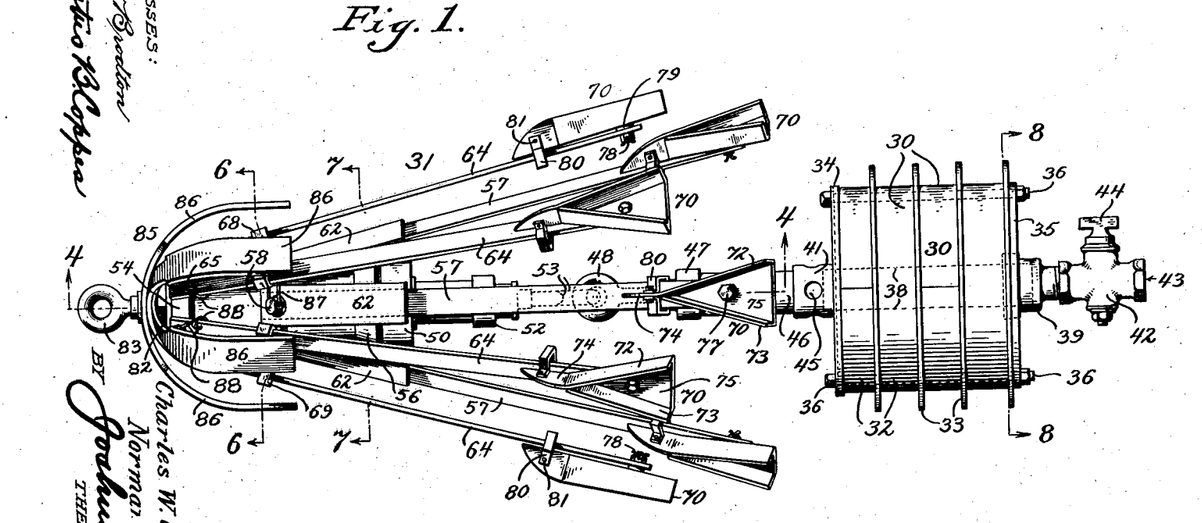
Figure 1 is a longitudinal elevation of a device made in accordance with our invention.
Figure 2:
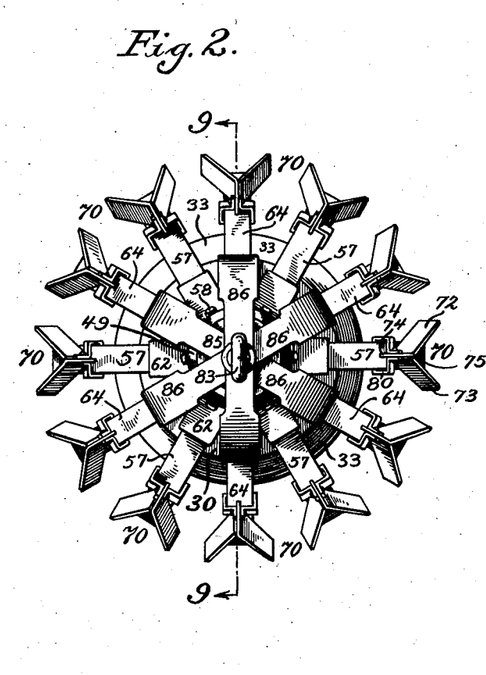
Figure 2 is a front end view of said device.
Figure 3:
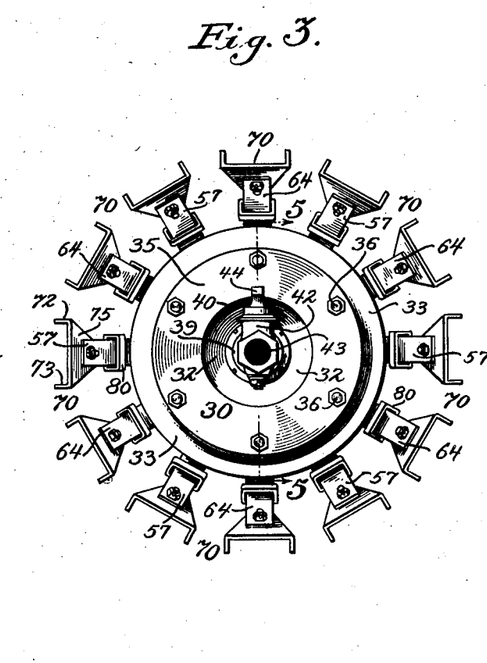
Figure 3 is a rear end view of said device.

A yoke 80 is preferably swung from a supporting pin 81 on the portion 74 of the plow and said yoke extends around the respective arm forward of the bolt 77 so that a slight movement is allowed for each of the plows. The plows are secured to the various arms at equal distances from their rear ends and since one series of the arms is secured to the core at a position in advance of the securing points of the other series of arms, it will be noted that the plows on one series of arms will be located forward of the plows on the other of the arms but will be in different radial planes with respect to the axis of the core and its axial associated parts. Owing to its arrangement it will be noted by an inspection of Figures 2 and 3 that when the various arms are flexed toward the axis of the core, or toward the axis of a pipe through which the device passes, the plows will be capable of engaging every portion of the inner surface of the pipe through which they pass and it is therefore unnecessary to impart any rotation to the device during the progress thereof through a pipe which it is intended to clean.

The core 49 has a plug 82 secured in its forward end and said plug is tapped to receive a terminal eye bolt 83. This eye bolt has an enlargement or flange 84 adapted to secure a head guard 85 to the core. This head guard consists of a number of bowed strips 86 of resilient metal which overlap each other between their ends and the overlapping portions have holes through which the stem of the eye bolt 83 extends. The arrangement of the strips 86 is such that they form a guard in advance of the forward end of the core 49 and then extend rearward over the stud bolts 65 and eye bolts 69 in a position alternating with the guard members 62. The guard strips 86 thus arranged serve as a centering means for the device during the movement thereof through a pipe and also tend to prevent any of the parts from dropping in any apertures such for example as provided in gate valves or other apertures within the length of the pipe being cleaned.

The arms 86 and the members 62 also serve to prevent the projecting parts of the stud bolts and arm securing and positioning eye bolts from encountering articles in the pipe line which might injure them. Furthermore these members 86 and 62 serve as a protection for the front ends of the arms 57 and 64.

Figures 6, 26:
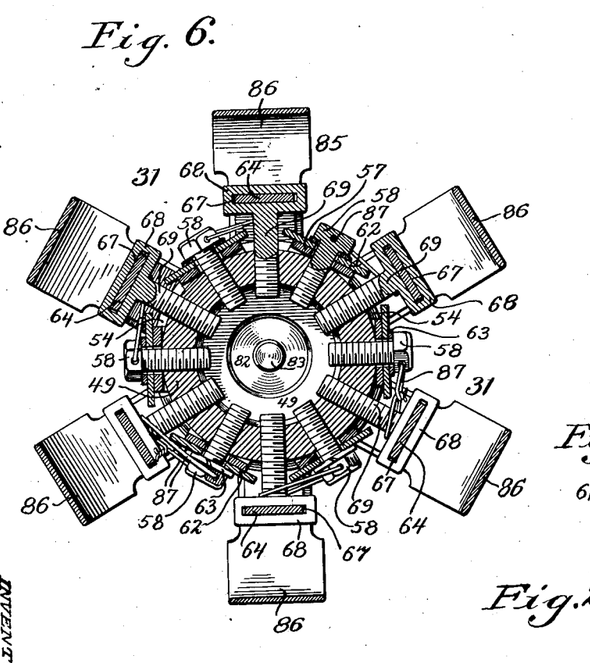
Figure 6 is an enlarged transverse section taken on the line 6—6 of Figure 1.
Figure 26 is a top plan view of Figure 25.
Figure 7:
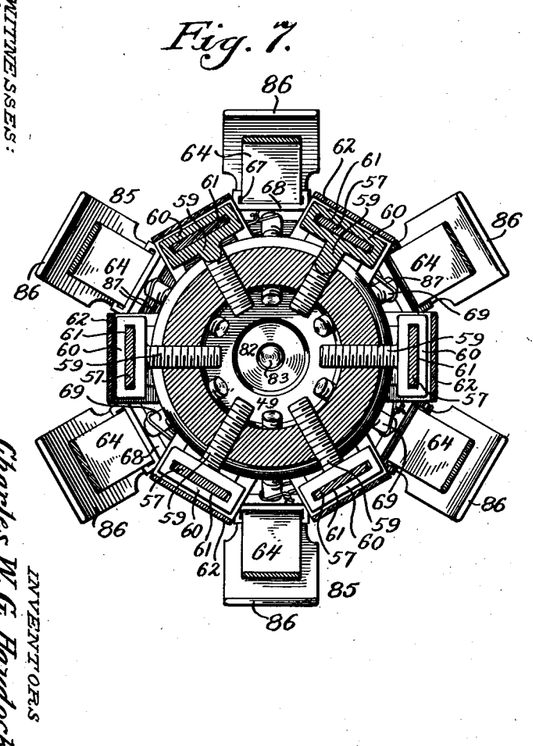
Figure 7 is an enlarged transverse section taken on the line 7—7 of Figure 1.
Figure 8:
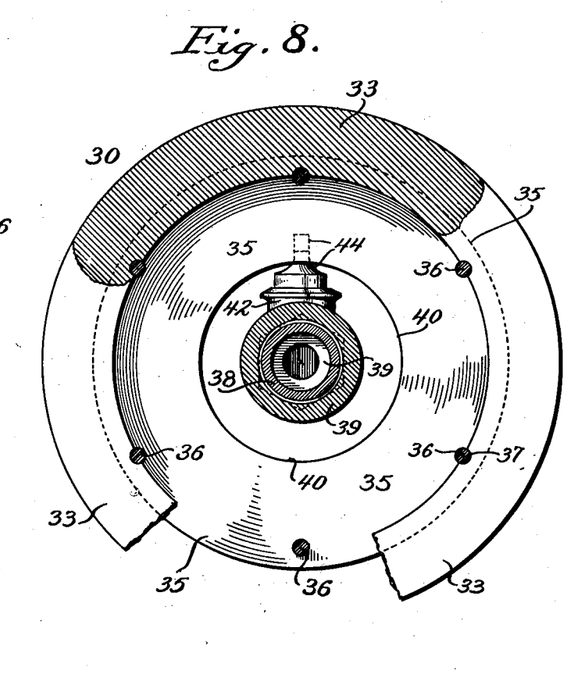
Figure 8 is an enlarged transverse section taken on the line 8—8 of Figure 1.

As an additional means for guarding against the accidental outward movement of the stud bolts, we preferably form holes in the heads of the stud bolts and insert a wire therethrough and then bend the wire around the shanks of the adjacent eye bolts 69 and then twist the ends of the wire together or otherwise secure them as shown in Figure 6; the wire being illustrated at 87. In the same manner the stud bolts 65 have wires 88 extending through holes in their heads; said wires being wrapped around the arms 64 and being twisted or otherwise secured together at their ends.

When the device is used for cleaning a pipe line, two cuts are made in the pipe line, one at each end of the section to be cleaned. The device is then placed in the line at the cut nearest the source of pressure. After this, the line is closed to connect the section with the source of pressure and a valve at the source of pressure is opened which permits the water or other fluid to act on the rear side of the piston. This pressure causes the piston to move forward and the forward motion is transmitted to the cleaning head. The portion of the water passing through the hollow stem 38 of the piston must pass through the valve 42 and this valve can be regulated to allow a sufficient quantity of the water to pass outward through the lateral openings 45 of the collar 41 to wash the removed materials through the pipe line in advance of the cleaner; the dirty water and the removed materials being discharged from the pipe line at the cut in the line at the end of the section which is being cleaned. After the device has passed through the section which has been cleaned it is removed at the lower cut and that cut is repaired so that as soon as the line has been washed out it can be replaced in service.

The large terminal eye bolt 83 can be used as a convenient means for attaching a cable to the cleaner by means of which it can be pulled through a pipe line in such cases where there is no water pressure available to force it through. In the second place this terminal eye bolt serves as a useful means for allowing the handling of the device. The connection between the cleaner head and the piston afforded by the eyes 48 and 53 serves as a universal joint allowing the free movement of the parts relatively to each other. By attaching the spring plow arms in the manner above described, the tension thereof can be readily adjusted and furthermore the plows will not foul each other. The length and shape of the plows is such that they cannot catch in the spaces between the sides of open gate valves and the long spring arms provide sufficient flexibility so that if the cleaner encounters an obstruction in the line which it is unable to dislodge, such as a projecting end of a corporation cock, the plow will be forced in or aside and ride over the obstruction without damage and then resume its proper position so that the entire interior surface of all sections of the pipe line can be properly cleaned. The eyes 48 and 53 can be welded within their respective coupling reducers 47 and 52 and if desired all of the other portions between the eyes 48 and 53 and the piston and core 49 can be welded so that the eyes 48 and 53 will provide a flexible coupling and so that the other portions cannot work loose.

The gaskets of the piston form contact with the interior surface of the pipe and the water pressure is exerted against them. The disks of the piston are of a sufficient amount smaller in diameter so that they will not catch on any obstruction not dislodged by the plows but will permit the leather gaskets to pass over such obstructions uninjured. The length of the piston is such that it cannot drop into the open space between the gates of open gate valves or other apertures.

While we have described our invention as taking a particular form, it will be understood that the various parts of our invention may be changed without departing from the spirit thereof, and hence we do not limit ourselves to the precise construction set forth, but consider that we are at liberty to make such changes and alterations as fairly come within the scope of the appended claims.

Having thus described our invention, what we claim as new and desire to secure by Letters Patent is:—

1. In a pipe cleaner, a cleaning head; a series of disks; flexible rings between the disks; means passing through the disks adjacent their periphery and within the rings for securing the disks to the rings; a pipe extending through and secured to the disks and having radial openings, and means for connecting the pipe to the head.

2. In a pipe cleaner, a cleaning head; a series of disks; flexible rings between the disks; bolts passing through the disks adjacent their periphery and within the rings for securing the disks to the rings; a pipe extending through the disks and secured thereto; a sleeve having radial openings and secured to one end of the pipe; a valve connected to the other end of the pipe, and means for connecting the sleeve to the head.

3. In a pipe cleaner, a cleaning head; a series of disks; flexible rings between the disks; means passing through the disks adjacent their periphery and within the rings for securing the disks to the rings; a pipe extending through the disks and secured thereto; a sleeve having radial openings and secured to one end of the pipe; a valve; a coupling for connecting the valve to the other end of the pipe, and means for connecting the sleeve to the head.

4. In a pipe cleaner, a cleaning head; a series of disks; flexible rings between the disks; means passing through the disks adjacent their periphery and within the rings for securing the disks to the rings; a pipe extending through the disks and secured thereto; a sleeve having radial openings and secured to one end of the pipe; a valve; means for connecting the valve to the other end of the pipe, a pair of eyes flexibly connected to each other; means for connecting the eyes to the sleeve, and means for connecting the eyes to the head.

5. In a pipe cleaner, a core; a series of plow arms secured to the core; eye bolts in the core embracing the arms, and U-shaped strips secured to the core and having their ends extending over the eye bolts.

6. In a pipe cleaner; a core provided with bosses; a series of plow arms secured to one of the bosses; another series of plow arms secured to an adjacent boss; eye bolts in the adjacent boss embracing the arms of the first series, and U-shaped strips secured to the core and having their ends extending over the eye bolts.

7. In a pipe cleaner; a core provided with bosses; a series of plow arms secured to one of the bosses; a second series of plow arms secured to a second boss; eye bolts secured to a third boss for embracing the plow arms of the second series; guard members secured to the core and extending over the eye bolts; eye bolts secured to the second boss for embracing the arms of the first series, and U-shaped strips secured to the core having their ends extending over the last mentioned eye bolts.

8. In a pipe cleaner; a cleaning head including plow arms; a plow movably connected to the arm, and a yoke fixed to the plow adapted to engage the plow arm and limit the movement of the plow.

9. In a pipe cleaner; a plow bent from sheet material to form a tapering base having its side edges upturned to form side flanges.

10. In a pipe cleaner, a plow having a tapering base with upturned side flanges, one of the flanges extending beyond the adjacent edge of the other.

11. In a pipe cleaner, a plow having a tapering base with upturned side flanges, one of the flanges extending beyond the adjacent edge of the other; an arm movably supporting the plow, and a yoke fixed to the extension of the flange adapted to engage the arm and limit the movement of the plow.

12. In a pipe cleaner, a cleaner head including connecting means; a plow arm; an eye bolt in said connecting means providing an opening through which said arm extends; and means spaced from said eye bolt for securing said arm to said connecting means; substantially as described.

13. In a pipe cleaner, a cleaner head including connecting means; a plow arm; an eye bolt in said connecting means providing an opening through which said arm extends; means spaced from said eye bolt for securing said arm to said connecting means; and a guard member extending over said eye bolt; substantially as described.

14. In a pipe cleaner, a cleaner head including connecting means; a plow arm; an eye bolt in said connecting means providing an opening through which said arm extends; and a bolt spaced from said eye bolt and operative to secure said arm to said connecting means; substantially as described.

15. In a pipe cleaner, a cleaner head including connecting means; a plow arm; an eye bolt in said connecting means providing an opening through which said arm extends; a bolt spaced from said eye bolt and operative to secure said arm to said connecting means; and a guard member secured by said latter bolt and extending over said eye bolt; substantially as described.

In testimony whereof we have signed our names to this specification in the presence of two subscribing witnesses.

CHARLES W. G. HAYDOCK.
NORMAN V. BUREAU.

Witnesses:
   Elizabeth Garbe,
   Chas. E. Potts.